US012614260B2

(12) United States Patent
Wang et al.

(10) Patent No.: US 12,614,260 B2
(45) Date of Patent: Apr. 28, 2026

(54) SELFIE PERSPECTIVE UNDISTORTION BY 3D FACE GAN INVERSION

(71) Applicant: Snap Inc., Santa Monica, CA (US)

(72) Inventors: Jian Wang, Pittsburgh, PA (US);
Zhixiang Wang, New York, NY (US);
Gurunandan Krishnan Gorumkonda, Kirkland, WA (US)

(73) Assignee: Snap Inc., Santa Monica, CA (US)

( * ) Notice: Subject to any disclaimer, the term of this patent is extended or adjusted under 35 U.S.C. 154(b) by 406 days.

(21) Appl. No.: 18/113,036

(22) Filed: Feb. 22, 2023

(65) Prior Publication Data

US 2024/0281936 A1 Aug. 22, 2024

(51) Int. Cl.
*G06T 5/77* (2024.01)
*G06V 40/16* (2022.01)

(52) U.S. Cl.
CPC .............. *G06T 5/77* (2024.01); *G06V 40/166* (2022.01); *G06T 2207/20084* (2013.01); *G06T 2207/20132* (2013.01)

(58) Field of Classification Search
CPC ............. G06T 5/77; G06T 2207/20132; G06T 2207/30201; G06T 5/80; G06T 2207/20084; G06T 2207/20081; G06T 5/60; G06V 40/166
See application file for complete search history.

(56) References Cited

U.S. PATENT DOCUMENTS

2009/0059041 A1 3/2009 Kwon
2022/0138455 A1 5/2022 Nagano et al.

2023/0245330 A1* 8/2023 Nadir ......................... G06T 5/60
382/100
2023/0252714 A1* 8/2023 Bradley ................. G06T 15/205
345/582
2024/0193891 A1 6/2024 Markhasin et al.

OTHER PUBLICATIONS

Efficient Geometry-aware 3D Generative Adversarial Networks (Year: 2022).*
Fried, Ohad, et al., "Perspective-Aware Manipulation of Portrait Photos", ACM Transactions on Graphics, vol. 35, Issue 4, Article 128, Jul. 11, 2016, pp. 1-10.
Zhao, Yajie, et al., "Learning Perspective Undistortion of Portraits", IEEE/CVF International Conference on Computer Vision (ICCV), Seoul, Korea, Oct. 27, 2019-Nov. 2, 2019, pp. 7849-7859.

(Continued)

*Primary Examiner* — Ming Y Hon
*Assistant Examiner* — Amanda H Pearson
(74) *Attorney, Agent, or Firm* — CM Law; Stephen J. Weed

(57) ABSTRACT

A method of correcting perspective distortion of a selfie image captured with a short camera-to-face distance by processing the selfie image and generating an undistorted selfie image appearing to be taken with a longer camera-to-face distance. A pre-trained 3D face GAN processes the selfie image, inverts the 3D face GAN to obtain improved face latent code and camera parameters, fine tunes a 3D face GAN generator, and manipulates camera parameters to render a photorealistic face selfie image. The processed selfie image has less distortion in the forehead, nose, cheek bones, jaw line, chin, lips, eyes, eyebrows, ears, hair, and neck of the face.

19 Claims, 11 Drawing Sheets

(56) References Cited

OTHER PUBLICATIONS

Bharadwaj, Shrisha et al. "FLARE: Fast learning of animatable and relightable mesh avatars". arXiv preprint arXiv:2310.17519 (2023).

Chan et al: "Efficient Geometry-aware 3D Generative Adversarial Networks", arxiv.org, Cornell University, Ithaca, NY, Apr. 27, 2022 (Apr. 27, 2022), XP091195806.

Daněček, Radek et al. "Emoca: Emotion driven monocular face capture and animation". In Proceedings of the IEEE/CVF Conference on Computer Vision and Pattern Recognition (2022), pp. 20311-20322.

Deng, Jiankang et al. "Arcface: Additive angular margin loss for deep face recognition". In Proceedings of the IEEE/CVF conference on computer vision and pattern recognition. (2019a) pp. 4690-4699.

Deng, Yu et al. "Accurate 3d face reconstruction with weakly-supervised learning: From single image to image set". In Proceedings of the IEEE/CVF conference on computer vision and pattern recognition workshops. (2019b) 0-0.

Dinu, Jonathan: "Hugging Face. Face Parsing." (2021) https://huggingface.co/jonathandinu/face-parsing.arxiv:2105.15203 [Online; accessed Jan. 1, 2024].

Feng, Yao et al.: "Learning an animatable detailed 3D face model from in-the-wild images". ACM Transactions on Graphics, (ToG) 40, 4 (2021), pp. 1-13.

Goodfellow, Ian et al.: "Generative adversarial nets". Advances in neural information processing systems 27 (2014).

Gulrajani, Ishaan et al.: "Improved training of wasserstein gans". Advances in neural information processing systems 30 (2017).

Guo, Jia et al.: "Perspective reconstruction of human faces by joint mesh and landmark regression". In European Conference on Computer Vision. (2022) Springer, 350-365.

International Search Report and Written Opinion for International Application No. PCT/US2024/015996, dated Jun. 26, 2024 (Jun. 26, 2024)—14 pages.

Isola, Phillip et al.: "Image-to-image translation with conditional adversarial networks". In Proceedings of the IEEE conference on computer vision and pattern recognition. (2017) pp. 1125-1134.

Kao, Yueying et al.: "Towards 3d face reconstruction in perspective projection: Estimating 6dof face pose from monocular image". IEEE Transactions on Image Processing (2023).

Khakhulin, Taras et al.: "Realistic one-shot mesh-based head avatars". In European Conference on Computer Vision. (2022) Springer, pp. 345-362.

Kingma, Diederik P. et al.: "Adam: A method for stochastic optimization." arXiv preprint arXiv:1412.6980 (2014).

Legendre, Chloe et al.: "Efficient multispectral facial capture with monochrome cameras." In ACM SIGGRAPH 2018 Posters. pp. 1-2.

Li, Tianye et al.: "Learning a model of facial shape and expression from 4D scans." ACM Trans. Graph. 36, 6 (2017), 194-1.

Lin et al.: "3D GAN Inversion for Controllable Portrait Image Animation", arxiv.org, Cornell University, Ithaca, NY, Mar. 25, 2022 (Mar. 25, 2022), XP091184354.

Lugaresi, Camillo et al.: "Mediapipe: A framework for building perception pipelines." arXiv preprint arXiv:1906.08172 (2019).

Nvidia. (2019). "Flickr-Faces-HQ Dataset (FFHQ)". https://github.com/NVlabs/ffhq-dataset. [Online; accessed Jan. 1, 2024].

Pang, Yingxue et al.: "Image-to-image translation: Methods and applications." IEEE Transactions on Multimedia 24 (2021), pp. 3859-3881.

Paysan, Pascal et al.: "A 3D face model for pose and illumination invariant face recognition". In 2009 sixth IEEE international conference on advanced video and signal based surveillance. (2009) IEEE, pp. 296-301.

Ramon, Eduard et al.: "Multi-view 3D face reconstruction in the wild using siamese networks". In Proceedings of the IEEE/CVF International Conference on Computer Vision Workshops. (2019) 0-0.

Ronneberger, Olaf et al.: "U-net: Convolutional networks for biomedical image segmentation". In Medical Image Computing and Computer-Assisted Intervention—MICCAI 2015: 18th International Conference, Munich, Germany, Oct. 5-9, 2015, Proceedings, Part III 18. Springer, pp. 234-241.

Ruiz, Nataniel et al.: "Dreambooth: Fine tuning text-to-image diffusion models for subject-driven generation". In Proceedings of the IEEE/CVF Conference on Computer Vision and Pattern Recognition. (2023) pp. 22500-22510.

Shih, YiChang et al.: "Distortion-free wide-angle portraits on camera phones". ACM Transactions on Graphics (TOG) 38, 4 (2019), pp. 1-12.

Szymanowicz, Stanislaw et al.: "Photo-Realistic 360° Head Avatars in the Wild". In European Conference on Computer Vision. (2022) Springer, pp. 660-667.

Valente, Joachim et al.: "Perspective distortion modeling, learning and compensation". In Proceedings of the IEEE Conference on Computer Vision and Pattern Recognition Workshops. (2015) pp. 9-16.

Wang et al.: "DisCO: Portrait Distortion Correction with Perspective-Aware 3D GANs", arxiv.org, Cornell University, Ithaca, NY, Feb. 23, 2023 (Feb. 23, 2023), XP091449486.

Wang, Ting-Chun et al.: "Video-to-video synthesis". arXiv preprint arXiv: 1808.06601 (2018).

Wikipedia: "Camera's intrinsic parameters". 2019. https://en.wikipedia.org/wiki/Camera_resectioning#Intrinsic_parameters. [Online; accessed Jan. 1, 2024].

Wood, Erroll et al.: "3d face reconstruction with dense landmarks". In European Conference on Computer Vision. (2022) Springer, 160-177.

Zhang, Richard et al.: "The unreasonable effectiveness of deep features as a perceptual metric". In Proceedings of the IEEE conference on computer vision and pattern recognition (2018), pp. 586-595.

Zhu, Jun-Yan et al.: "Unpaired image-to-image translation using cycle-consistent adversarial networks". In Proceedings of the IEEE international conference on computer vision. (2017) pp. 2223-2232.

Zielonka, Wojciech et al.: "Towards metrical reconstruction of human faces". In European Conference on Computer Vision. (2022) Springer, pp. 250-269.

International Search Report and Written Opinion for PCT/US2025/034980 dated Oct. 8, 2025, 12 pages.

Kato, Hiroharu et al.: "Differentiable Rendering: A Survey," Arxiv.org, Cornell University Library, Ithaca, NY, Jul. 31, 2020, XP081726202.

Beeler, Thabo et al. "High-Quality Passive Facial Performance Capture Using Anchor Frames." Ed. by Hugues Hoppe. ACM SIGGRAPH 2011 papers 30.4 (2011): 1-10. Web.

Kato, Hiroharu et al.: "Neural 3D Mesh Renderer." 2018 IEEE/CVF Conference on Computer Vision and Pattern Recognition. IEEE, 2018.

* cited by examiner

Input: Distorted Selfie

Output: Distortion-Free

A 3D Face GAN Pre-Trained on FFHQ

400

402 Preprocessing selfie image

404 Improving face latent code and camera parameters of the 3D face GAN

406 Fine-tuning 3D face GAN generator

408 Manipulating camera parameters

410 Generating improved selfie image with a longer camera-to-face distance

500

102 Input Selfie

502 Ground Truth

504 Previous Method

104 Improved Image

SELFIE PERSPECTIVE UNDISTORTION BY 3D FACE GAN INVERSION

TECHNICAL FIELD

The present subject matter relates to image processing.

BACKGROUND

Electronic devices, such as smartphones, available today integrate cameras and processors configured to capture images and manipulate the captured images.

A selfie is a self-portrait photograph, typically taken with a camera of a portable electronic device such as a smartphone, which is usually held in the hand. Selfies are typically taken with the camera held at arm's length, as opposed to those taken by a selfie stick, using a self-timer or remote. Due to the limited distance imposed by the user's arm's length, such self-portrait photographs usually appear distorted.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Methods for correcting perspective distortion of a selfie image captured with a short camera-to-face distance by processing the selfie image and generating an undistorted selfie image appearing to be taken with a longer camera-to-face distance. A pre-trained 3D face GAN processes image data of the selfie image, inverts the 3D GAN to obtain face latent code and camera parameters, fine tunes a 3D GAN generator, and manipulates camera parameters to render a photorealistic face selfie image. The processed selfie image has less distortion in one or more of the forehead, nose, cheek bones, jaw line, chin, lips, eyes, eyebrows, ears, hair, and neck of the face.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

Figures 1, 2:
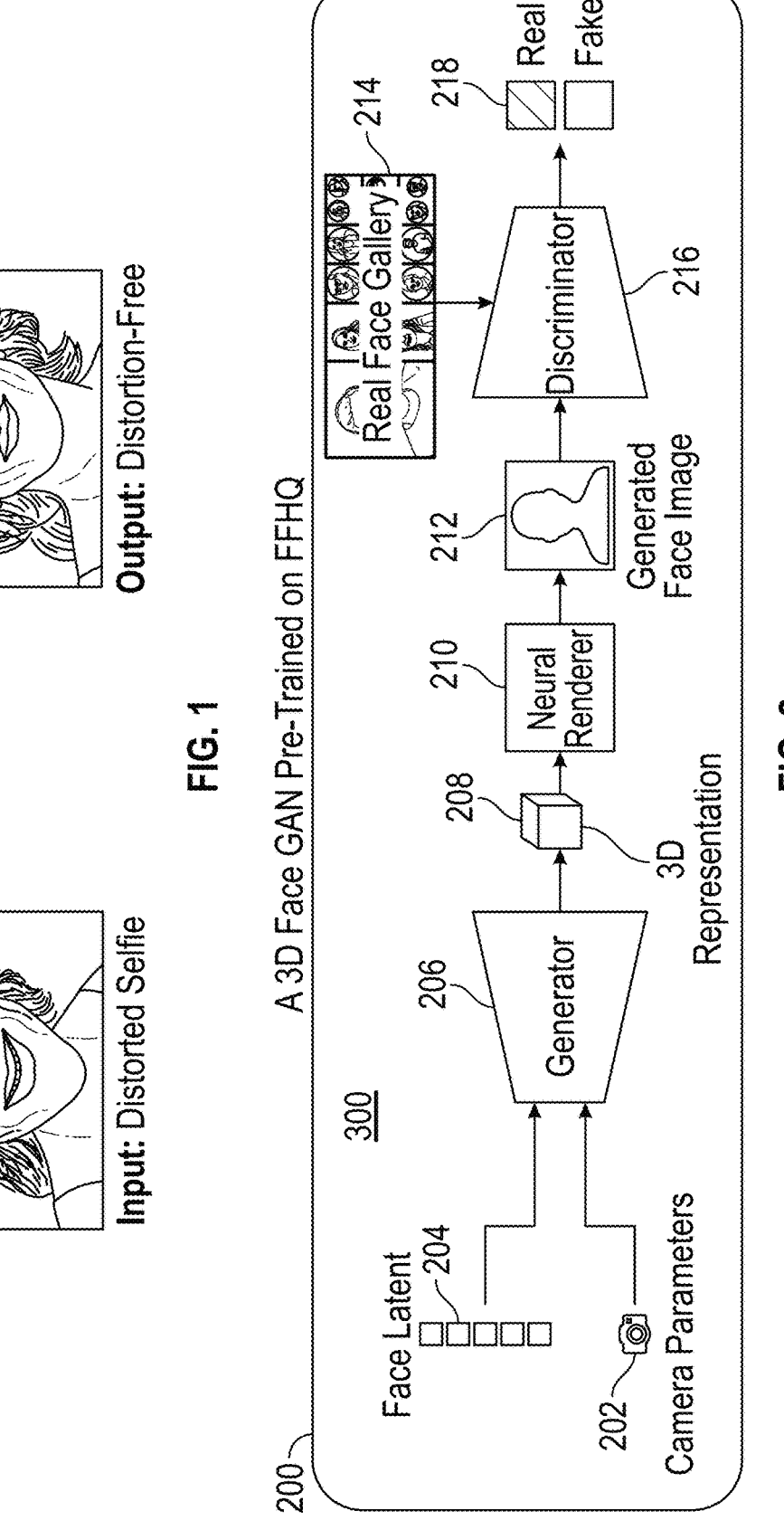
FIG. 1 is an illustration of an algorithm correcting perspective distortion of a selfie image.
FIG. 2 is a flow diagram of a pre-trained 3D face GAN executing the algorithm and having a pipeline.
Figure 11:
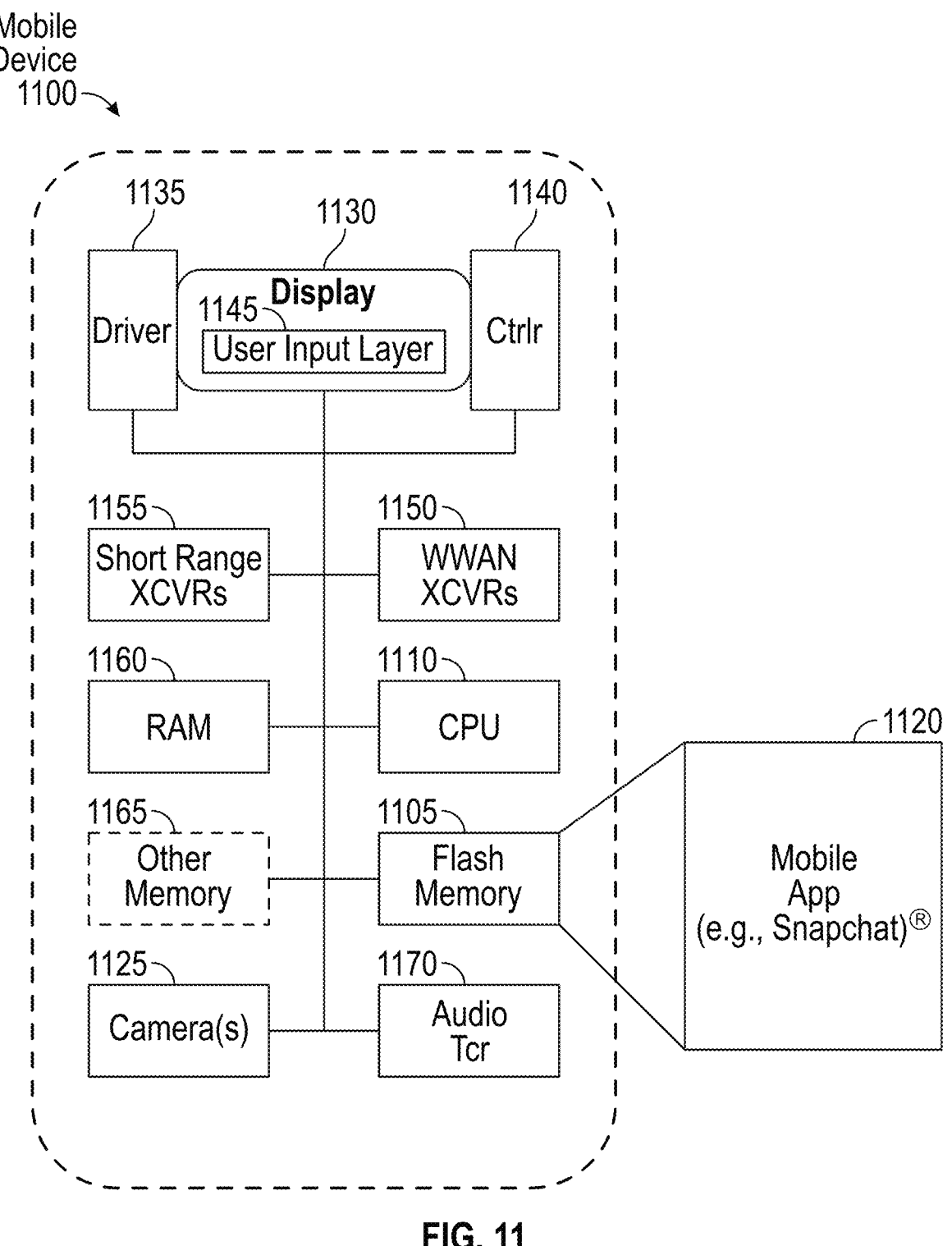
FIG. 11 is a block diagram of electronic components of a mobile device configured for use with the pipeline and method of FIG. 3A-3D and FIG. 4.

FIG. 1 is a flow diagram depicting an algorithm 100 image processing a selfie image 102 captured by a front facing camera 1125 using a processor 1110 of a mobile device 1100, such as a smartphone (FIG. 11). Algorithm 100 receives selfie image 102 of a user's face captured at an arbitrary short camera-to-face distance. In one example, the short camera-to-face distance is 20-60 cm. Selfie image 102 is significantly distorted due to the short camera-to-face distance resulting in an abnormal face shape with a nose appearing larger than normal. The distorted selfie image 102 also fails to include the ears of the face. The processed and improved selfie image 104 generated by algorithm 100 has zero to minimal distortion of the face. Selfie image 104 appears to have been captured from a long camera-to-face distance. In an example, the long camera-to-face distance is greater than 1.5 meters. Selfie image 104 has a better face appearance than selfie image 102 where the face, nose, and other image features have no apparent distortion. Selfie image 104 also includes ears on the face, which may or may not have been present in the input selfie image 102. In an example, image types of a face other than a selfie are used as an input image 102. These image types include but are not limited to portrait photos or head shots.

FIG. 2 is a flow diagram of a pre-trained 3D face GAN 200 executing algorithm 100 and having a pipeline 300. 3D face GAN 200 is inverted to invert selfie image 102 back into the latent space of a pre-trained GAN. 3D face GAN 200 is executed by processor 1110 using parameters 202 and face latent code 204 input to a generator 206 to produce a 3D representation 208 of input selfie image 102. The 3D representation 208 is processed by a neural renderer 210 to generate a photorealistic face image 212. The photorealistic face image 212 and the real face gallery 214 are processed by a discriminator 216 to discriminate between the real and fake images 218. Gallery 214 includes a plurality of images with faces, such as many people's selfie images. In an example, the 3D face GAN 200 is an EG3D (Efficient Geometry-aware 3D) face GAN pre-trained on a Flickr-Faces-HQ (FFHQ) dataset. In other examples, other 3D face GANs pre-trained on other face datasets are used. Other 3D face GANs include, but are not limited to, Fast 3D-Aware Image Synthesis with Sparse Voxel Grids (VoxGRAF), Controllable 3D Face Synthesis with Conditional Generative Occupancy Fields (cGoF), etc. and other datasets include, but are not limited to, CelebFaces Attributes Dataset (CelebA), synthetic sets, and other datasets collected online.

Figures 3A, 3B:
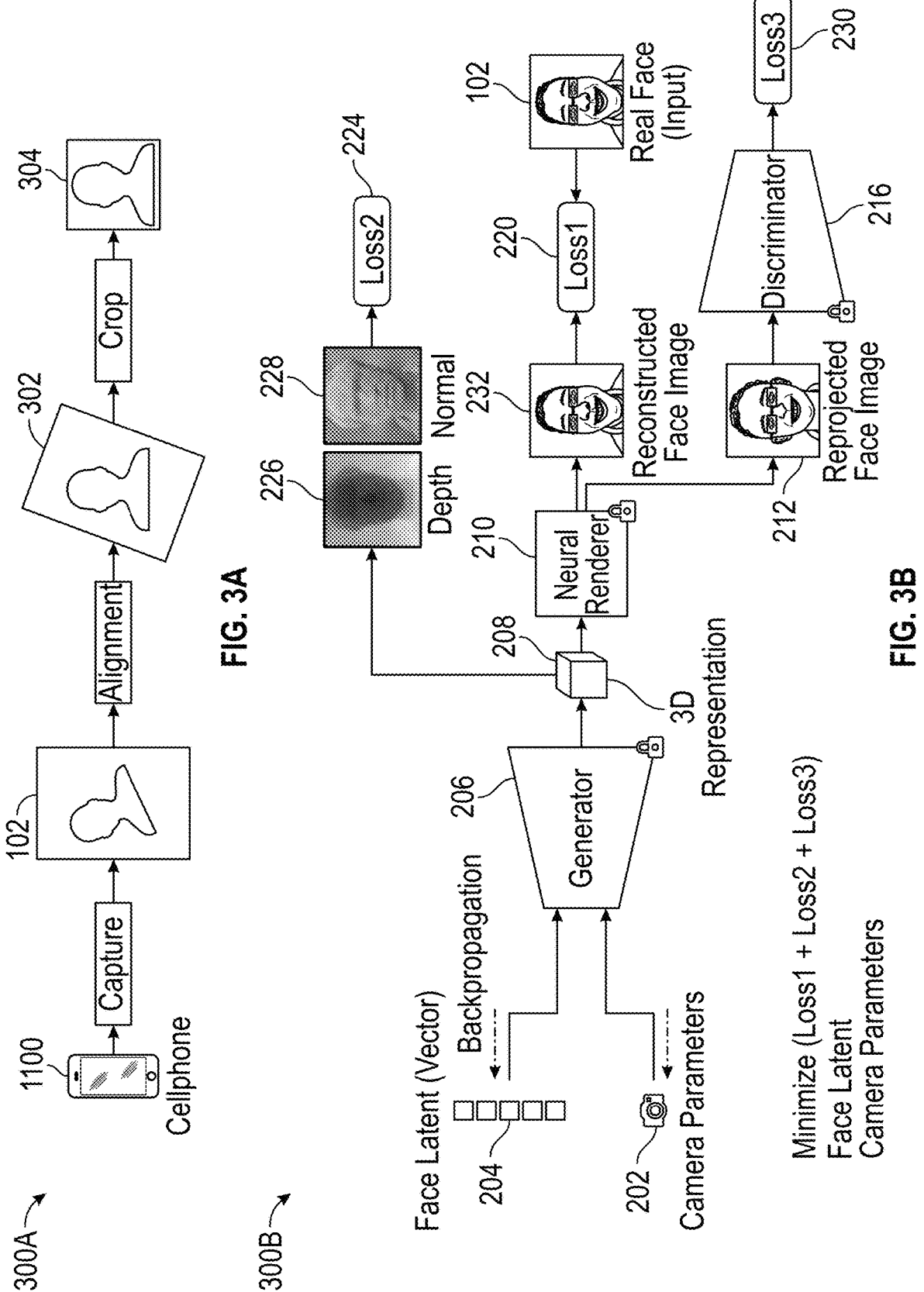
FIG. 3A is a flow diagram depicting a first part of the pipeline preprocessing of data.
FIG. 3B is a flow diagram of a second part of the pipeline that improves the face latent code and camera parameters of the 3D face GAN.

FIG. 3A is a flow diagram of a first part 300A of pipeline 300 executed by a processor 1110 (FIG. 11) that captures and preprocesses image data of selfie image 102. Selfie image 102 is captured at an arbitrary short camera-to-face distance. In one example, the short camera-to-face distance is 20-60 cm. Selfie image 102 is aligned to orient the face into a standard orientation image 302. The standard orientation image 302 is aligned to level and center the face in the image. The standard orientation image 302 is then cropped to remove excess background surrounding the face and to center the face in the image to produce a preprocessed image 304. In an example, the camera parameters of selfie image 102 are then estimated by fitting a 3D Morphable Face Models (3DMM) model and converted into a training camera format of 3D face GAN 200.

FIG. 3B is a flow diagram of a second part 300B of pipeline 300 executed by processor 1110 that inverts the 3D face GAN 200 to obtain improved camera parameters 202 and face latent code 204. Initially the 3D face GAN 200 (more specifically, the generator 206, the neural renderer 210, and the discriminator 216) is frozen and used to obtain depth 226 and normal 228 and render a photorealistic face image 232 and a reprojected face image 212 from a given random face latent code 204 and initialization camera parameters 202. A loss is calculated by the summation of: the difference between a reconstructed face image (rendered face image) 232 and selfie image 102 (loss 1), the smoothness of intermediate depth 226 and a normal map 228 (loss 2), and the adversarial loss of fake faces rendered with wrong camera parameters. A gradient descent is then employed to improve face latent code 204 and camera parameters 202 until the combined losses converge. In an example, the camera-to-face distance is constrained to be within 100 cm.

Figure 3C:
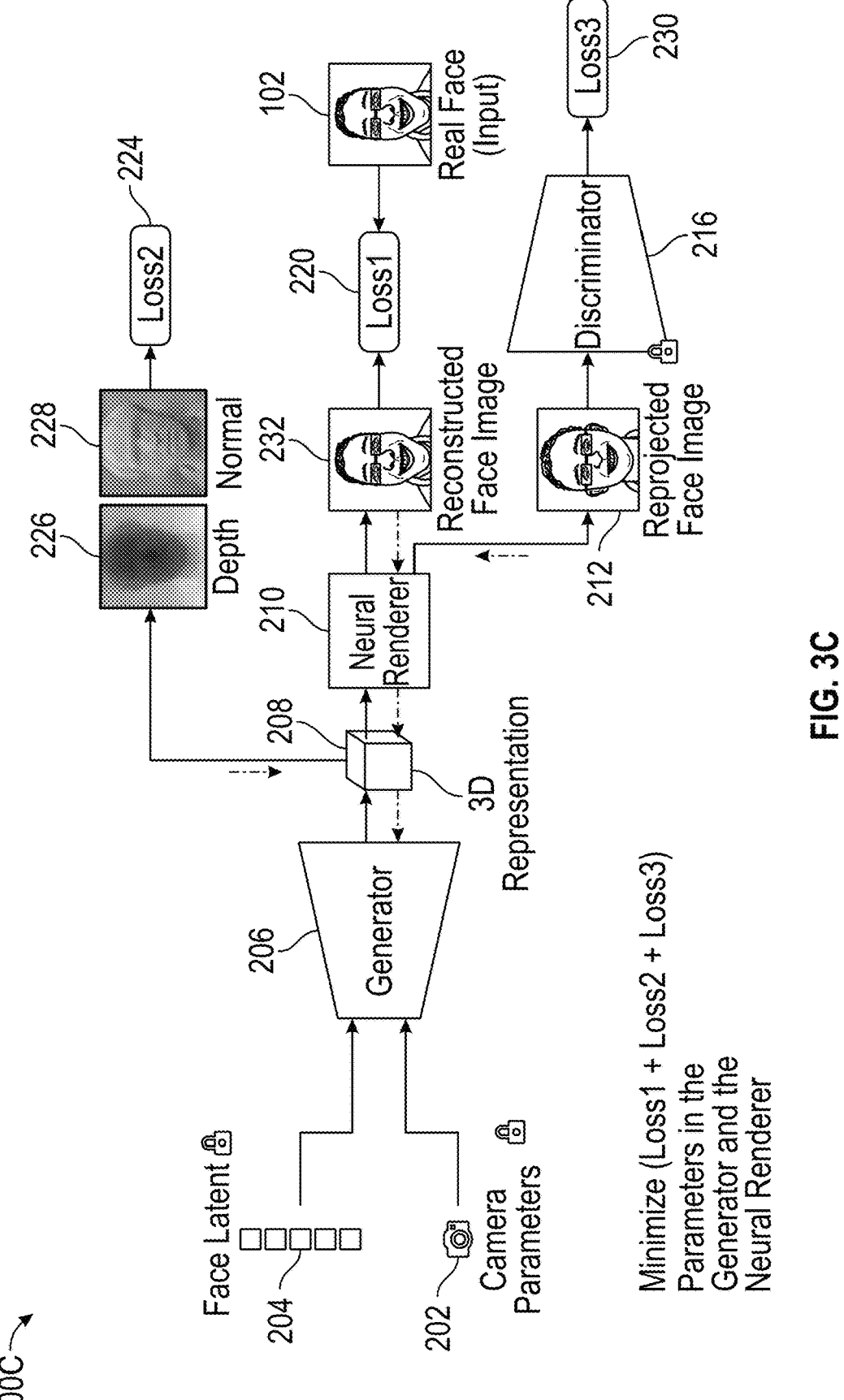
FIG. 3C is a flow diagram depicting a third part of the pipeline fine-tuning the 3D face GAN generator.

FIG. 3C is a flow diagram of a third part 300C of pipeline 300 that fine-tunes generator 206 and the neural renderer 210 of 3D face GAN 200. The improved face latent code 204 and camera parameters 202 obtained from second part 300B are used as the latent face code (vector) 204 and camera parameters 202 in a generator 206 improvement process. Given the improved face latent code 204 and camera parameters 202, depth 226 and normal 228 can be calculated and the neural renderer 210 renders reconstructed face image 232, and reprojected face image 212, which are photorealistic face images. A loss is calculated by the summation of loss 1, loss 2, and loss 3. A gradient descent is then employed to improve parameters of 3D face GAN 200 (more specifically, the parameters of the generator 206 and the neural renderer 210) until the combined losses converge.

Figure 3D:
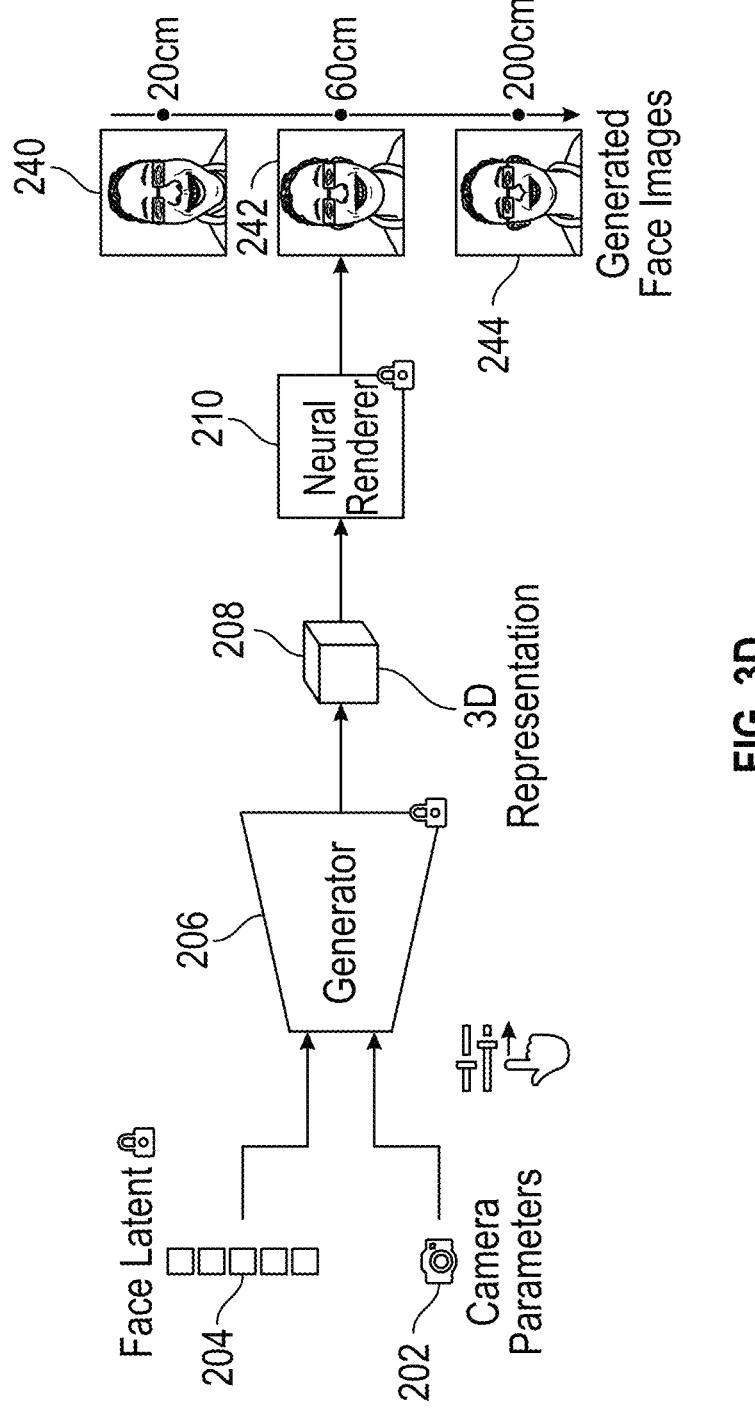
FIG. 3D is a flow diagram depicting a fourth part of the pipeline manipulating the camera parameters.

FIG. 3D is a flow diagram of a fourth part 300D of pipeline 300 that manipulates camera parameters 202, such as camera 1125 distance and focal length, to render photorealistic face selfie images 240, 242, and 244. The camera parameters 202 of camera distance and camera focal length are manipulated while keeping the pupillary distance of the face in selfie image 102 constant. In an example, the camera parameter 202 distance is set to 20 cm and 3D face GAN 200 generates image 240. In an example, the camera parameter 202 distance is set to 60 cm and 3D face GAN 200 generates image 242. In an example, the camera parameter 202 distance is set to 200 cm and 3D face GAN 200 generates image 244.

Figures 4, 5:
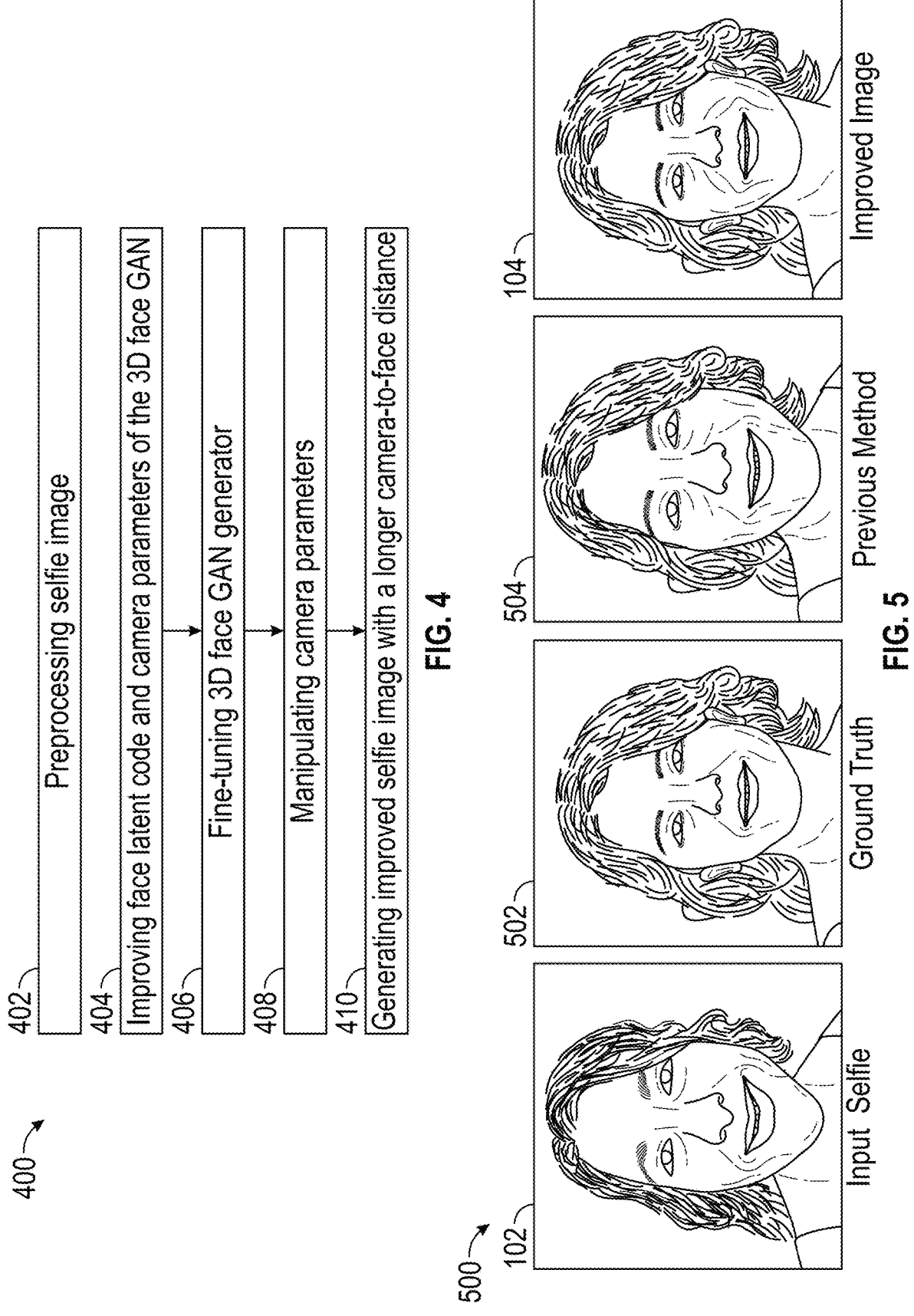
FIG. 4 is a flow chart illustrating a method of correcting perspective distortion of a selfie image and generating an improved selfie image using the pipeline.
FIG. 5 is an illustration including a comparison of the selfie image, ground truth, an image generated by a previous method, and the processed selfie image generated by the 3D face GAN.

FIG. 4 is a flow chart 400 illustrating a method of correcting perspective distortion of selfie image 102 and generating improved selfie image 104 using pipeline 300. The method utilizes 3D face GAN 200 operated by processor 1110 described with reference to FIGS. 3A-3D.

At block 402, selfie image 102 is pre-processed to align and crop a face in selfie image 102 as described with reference to pipeline part 300A in view of FIG. 3A. In an example, selfie image 102 is captured by a user with a front camera 1125 of a smart phone 1100 (FIG. 11). In an example, selfie image 102 is taken at a camera-to-face distance between 20 cm and 60 cm.

At block 404, 3D face GAN 200 is inverted to obtain camera parameters 202 and face latent code 204 as described with reference to pipeline part 300B in view of FIG. 3B. Initially, 3D face GAN 200 (more specifically, the generator 206, the neural render 210, and the discriminator 216) is frozen and used to obtain depth 226 and normal 228, and renderer photorealistic face images (reconstructed face image 232 and reprojected face image 212) from face latent code 204 and initialization camera parameters 202. A loss is calculated by the summation of: the difference between a reconstructed face image (rendered face image) 232 and the input selfie image 102 (loss 1), the smoothness of intermediate depth 226 and a normal map 228 (loss 2), and the adversarial loss of fake faces rendered with wrong camera parameters. A gradient descent is then employed to improve face latent code 204 and camera parameters 202 until the combined losses converge.

At block 406, generator 206 and the neural renderer 210 of 3D face GAN 200 are fine-tuned as described with reference to pipeline part 300C in view of FIG. 3C. Given face latent code 204 and camera parameters 202, 3D face GAN 200 renders photorealistic face images 232 and 212. A loss is calculated by the summation of loss 1, loss 2, and loss 3. A gradient descent is then employed to improve parameters of 3D face GAN 200 (more specifically, the generator 206 and the neural renderer 210) until the combined losses converge.

At block 408, camera parameters 202 are manipulated as described with reference to pipeline part 300D in view of FIG. 3D. The camera parameters 202 of camera distance and camera focal length are manipulated while keeping pupillary distance of the face in selfie image 102 constant. In an example, a user selects camera parameters 202. In another example, camera parameters 202 are set to a default value, for example, a face-to-camera distance of 200 cm.

At block 410, improved selfie image 104 is generated, shown as photorealistic face selfie images 240, 242, and 244 in FIG. 3D. In an example, the camera parameter 202 camera distance is set to 20 cm and 3D face GAN 200 generates selfie image 240. In another example, the camera parameter 202 camera distance is set to 60 cm and 3D face GAN 200 generates selfie image 242. In another example, the camera parameter 202 camera distance is set to 200 cm and 3D face GAN 200 generates image 244.

FIG. 5 illustrates a comparison 500 of selfie image 102, ground truth 502, an image 504 generated by a previous method such a flow-warping, and the processed selfie image 104 generated by 3D face GAN 200 using method 400. As illustrated, improved selfie image 104 is very similar to ground truth 502. There is little to no distortion present in the forehead, nose, cheek bones, jaw line, chin, lips, eyes, eyebrows, ears, hair, and neck of the face in processed selfie image 104.

Figure 6:
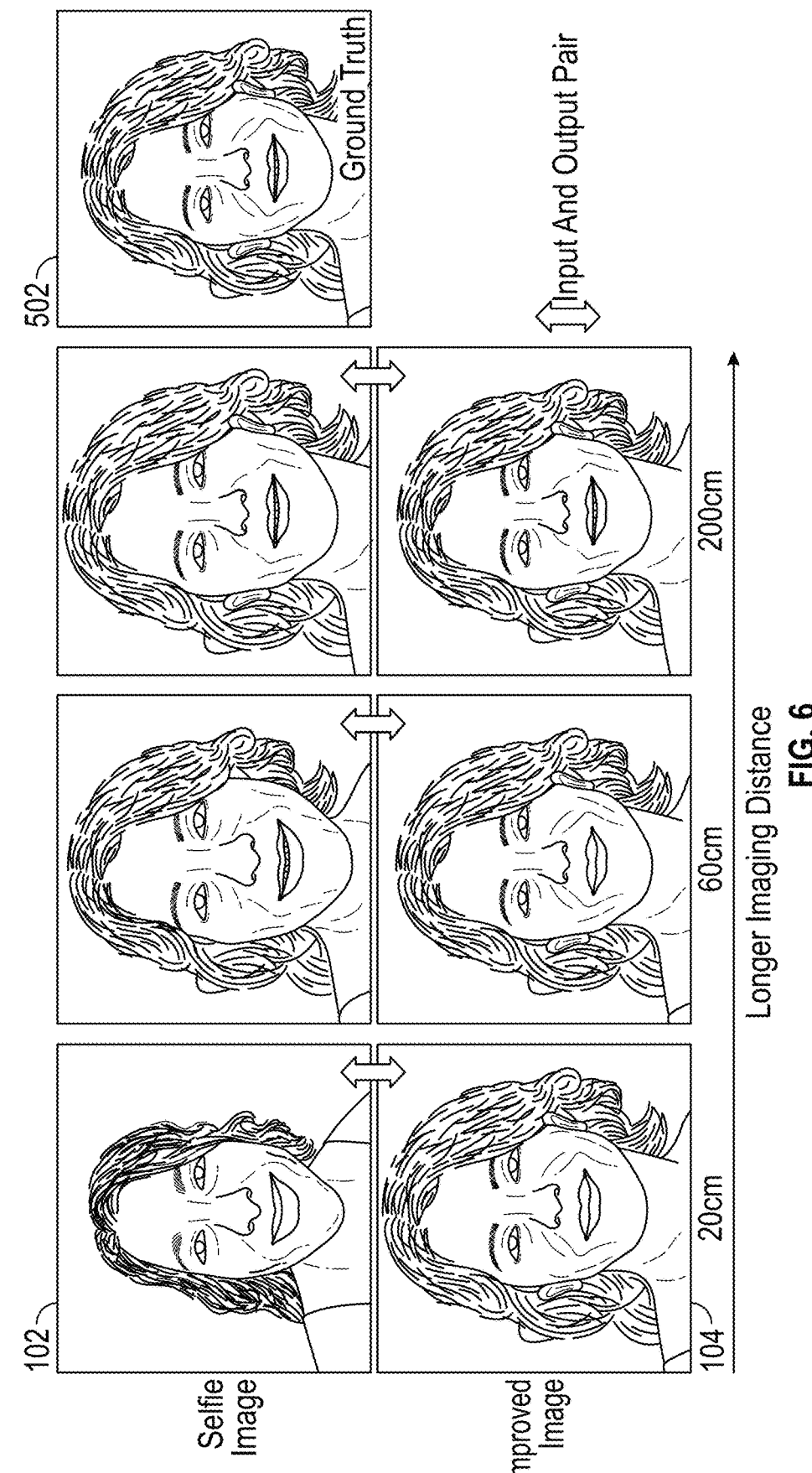
FIG. 6 includes illustrations of the processed selfie images generated by the 3D face GAN as a function of respective selfie images for different camera distances to show that the proposed method works for different distances.

FIG. 6 shows an illustration 600 of processed selfie images 104 generated by 3D face GAN 200 using method 400 as a function of respective selfie images 102 for different camera distances. It shows that the proposed method works for input of different camera-to-face distances. FIG. 6 shows illustration of selfie image 102 to processed selfie images 104 at camera distances of 20 cm, 60 cm, and 200 cm, as well as to ground truth 502.

Figure 7:
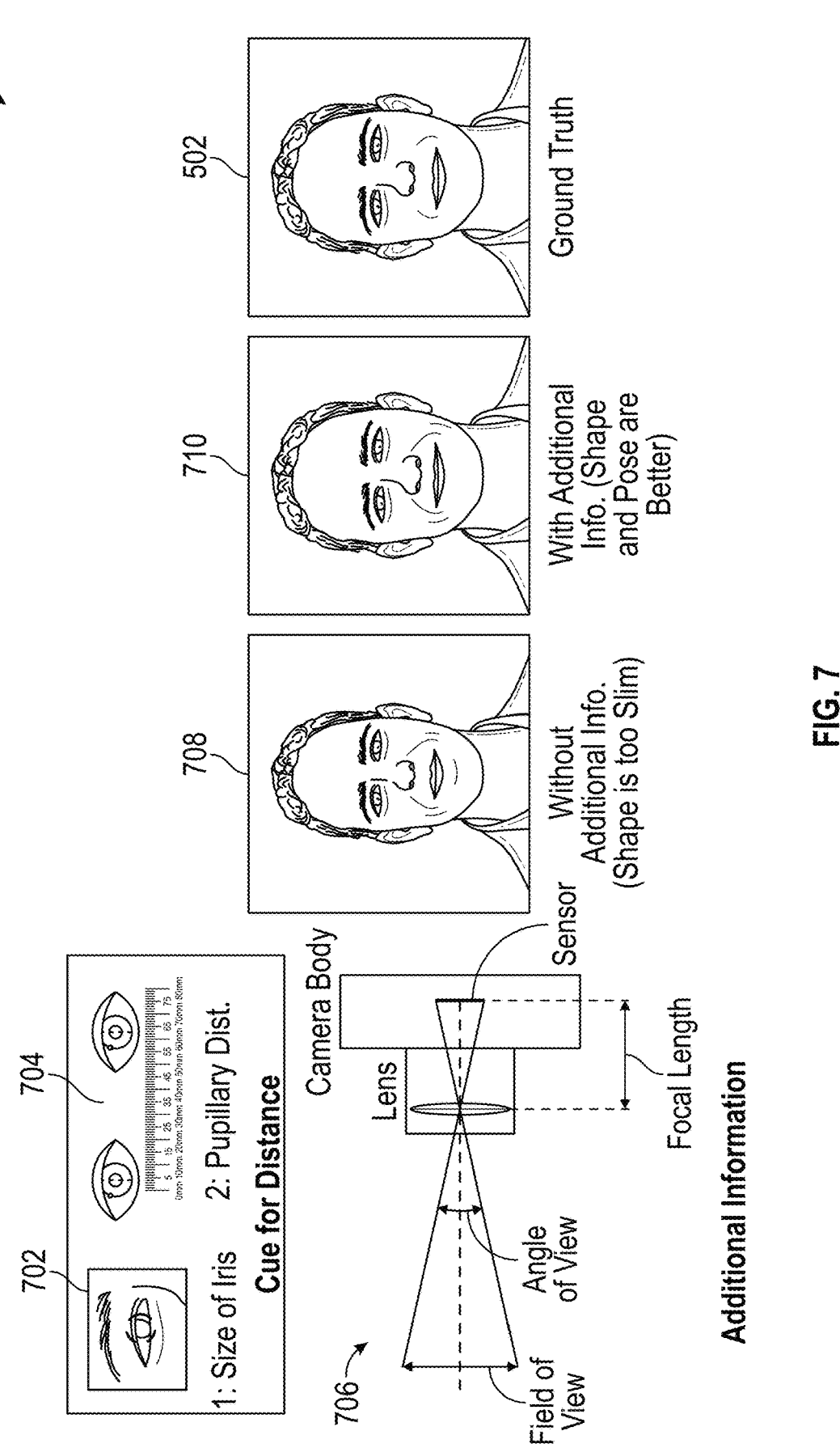
FIG. 7 is an illustration including a comparison of the 3D face GAN utilizing measurements determined from a face, or camera's focal length, or both as additional input to improve processed selfie image.

FIG. 7 illustrates a comparison 700 of 3D face GAN 200 utilizing measurements (iris size, pupillary distance) determined from a face, or camera's focal length, or both, of the same person as in selfie image 102 to improve processed selfie image 104. In one example 3D face GAN 200 utilizes a camera-to-face distance of the input image 102 as input to improve the image 104 as shown at 710. In one example, the camera-to-face distance is estimated by using the known iris size 702 of the user in the selfie image 102. In another example, the camera-to-face distance is estimated by the known interpupillary distance 704 of the user in the selfie image 102. Iris size 702 and interpupillary distance 704 can be based on user input or machine selection (e.g., an average iris/pupil size). In another example 3D face GAN 200 utilizes both the known iris size 702 and known interpupillary distance 704 to better estimate the camera-to-face distance and therefore improve the selfie image shown at 710. In another example, the known camera intrinsic values, such as focal length 706, are used by 3D face GAN 200 to improve results of the output image 710.

Figure 8:
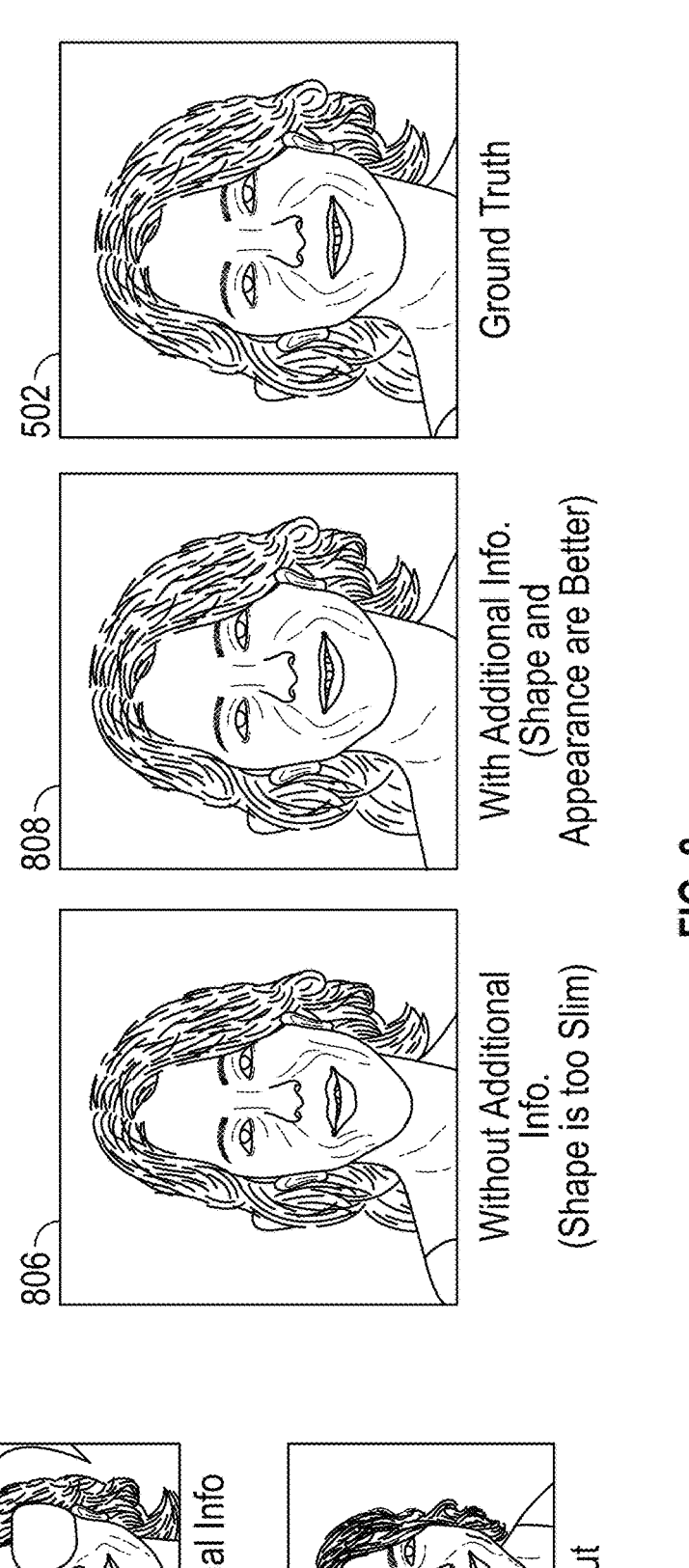
FIG. 8 is an illustration including a comparison of the 3D face GAN utilizing a reference image as additional input during improving the face latent code and camera parameters of the 3d face GAN.

FIG. 8 illustrates a comparison 800 of 3D face GAN 200 utilizing a reference image 802 as additional input during image processing. The reference image 802 may be any additional image of the face in selfie image 102, shown at 804. In one example the reference image 802 is an image of the same person but captured at a different time. The reference image 802 can be an image captured at a smaller, the same, or a larger camera-to-face distance. FIG. 8 illustrates selfie image 104 without using reference image 802 at 806, and an improved selfie image 104 at 808 by utilizing the reference image 802. The reference image 802 and selfie image 804 can be used to estimate 3D of the face and then the improved face latent code 204 and camera parameters 202 are more accurate.

Figure 9:
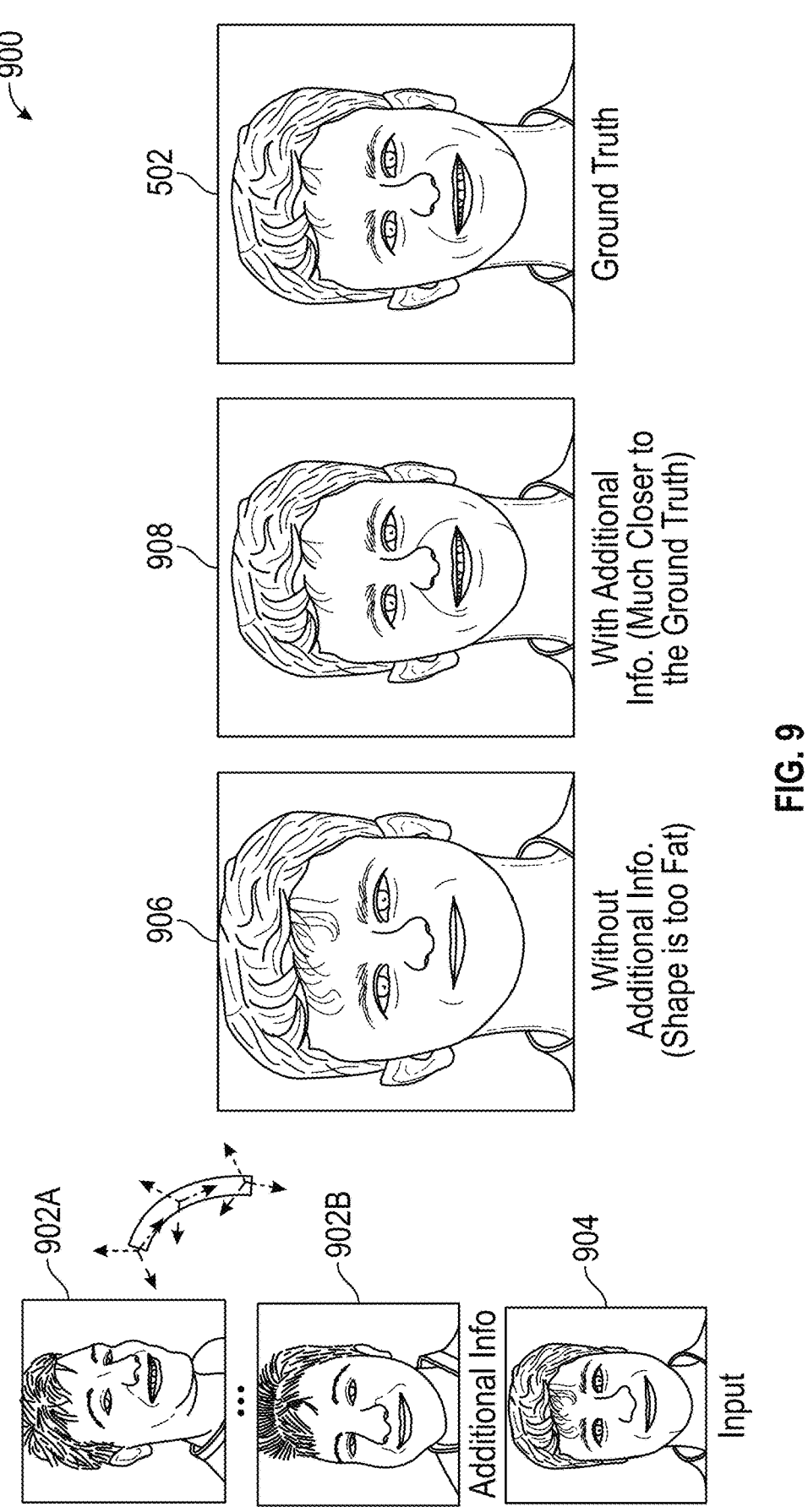
FIG. 9 is an illustration including a comparison of the 3D face GAN utilizing a burst of images taken when the user moves the camera around the user's face.

FIG. 9 illustrates a comparison 900 of 3D face GAN 200 utilizing a burst of images 902A and 902B taken when the user moves the camera 1125 around the user's face to capture images at varying angles before capturing selfie image 102. Burst images 902A-B are used to estimate the 3d geometry of the face. With the known face geometry, the optimized face latent code 204 and camera parameters 202 are more accurate. Output image 908 obtained by processing the burst of images 902A and 902B are less distorted than the image 906 obtained without using the burst images 902.

Figure 10:
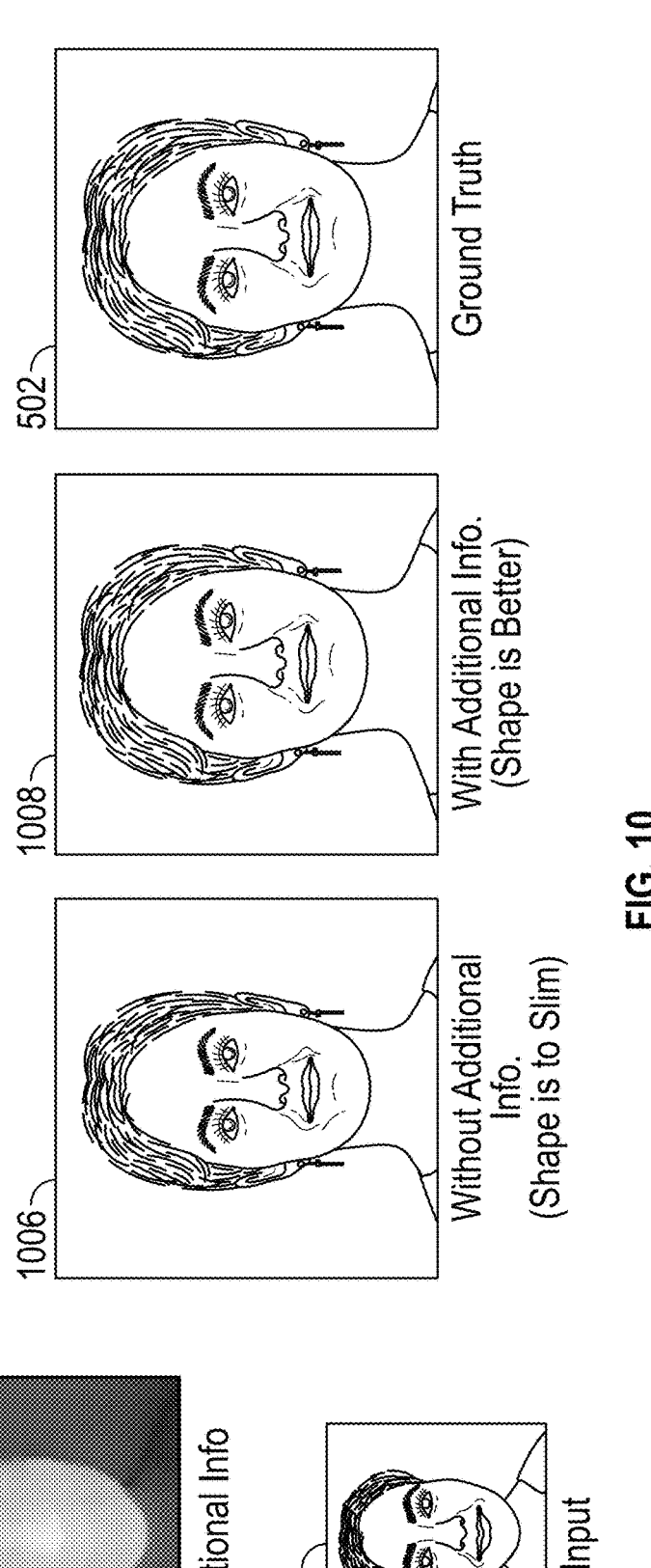
FIG. 10 is an illustration including a comparison of the 3D face GAN utilizing a depth image as additional input during improving the face latent code and camera parameters of the 3d face GAN.

FIG. 10 illustrates a comparison of 3D face GAN 200 utilizing a depth image 1002 as additional input during image processing. Depth image 1002 is a depth map of the face of the user in selfie image 102 and can be obtained by the depth sensor in some phones or any other methods. With the known 3d face geometry, the improved face latent code 204 and camera parameters 202 are more accurate. FIG. 10 illustrates that output image 1008 utilizing the depth image 1002 is less distorted than an image 1006 obtained without using depth image 1002.

As shown in FIG. 11, the mobile device 1100 includes at least one digital transceiver (XCVR) 1150, shown as WWAN (Wireless Wide Area Network) XCVRs, for digital wireless communications via a wide-area wireless mobile communication network. The mobile device 1100 also may include additional digital or analog transceivers, such as short-range transceivers (XCVRs) 1155 for short-range network communication, such as via NFC, VLC, DECT, Zig-Bee, BLUETOOTH®, or WI-FI®. For example, short range XCVRs 1155 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 1100, the mobile device 1100 also may include a global positioning system (GPS) receiver. Alternatively, or additionally, the mobile device 1100 may utilize either or both the short range XCVRs 1155 and WWAN XCVRs 1150 for generating location coordinates for positioning. For example, cellular network, WI-FI®, or BLU-ETOOTH® based positioning systems may generate very accurate location coordinates, particularly when used in combination. Such location coordinates may be transmitted to the mobile device 1100 over one or more network connections via XCVRs 1150, 1155.

The transceivers 1150, 1155 (i.e., the network communication interface) may conform to one or more of the various digital wireless communication standards utilized by modern mobile networks. Examples of WWAN transceivers 1150 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 1150, 1155 provide two-way wireless communication of information including digitized audio signals, still image and video signals, web page information for display as well as web-related inputs, and various types of mobile message communications to/from the mobile device 1100.

The mobile device 1100 may further include a microprocessor that functions as the central processing unit (CPU) 1110. A processor is a circuit having elements structured and arranged to perform one or more processing functions, typically various data processing functions. Although discrete logic components could be used, the examples utilize components forming a programmable CPU. A microprocessor for example includes one or more integrated circuit (IC)

chips incorporating the electronic elements to perform the functions of the CPU 1110. The CPU 1110, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 1110 or processor hardware in smartphone, laptop computer, and tablet.

The CPU 1110 serves as a programmable host controller for the mobile device 1100 by configuring the mobile device 1100 to perform various operations, for example, in accordance with instructions or programming executable by CPU 1110. For example, such operations may include various general operations of the mobile device 1100, as well as operations related to the programming for messaging apps and AR camera applications on the mobile device 1100. Although a processor may be configured by use of hardwired logic, typical processors in mobile devices are general processing circuits configured by execution of programming.

The mobile device 1100 further includes a memory or storage system, for storing programming and data. In the example shown in FIG. 11, the memory system may include flash memory 1105, a random-access memory (RAM) 1160, and other memory components 1165, as needed. The RAM 1160 may serve as short-term storage for instructions and data being handled by the CPU 1110, e.g., as a working data processing memory. The flash memory 1105 typically provides longer-term storage.

Hence, in the example of mobile device 1100, the flash memory 1105 may be used to store programming or instructions for execution by the CPU 1110. Depending on the type of device, the mobile device 1100 stores and runs a mobile operating system through which specific applications are executed. Examples of mobile operating systems include Google Android, Apple iOS (for iPhone or iPad devices), Windows Mobile, Amazon Fire OS (Operating System), RIM BlackBerry OS, or the like.

The mobile device 1100 may include an audio transceiver 1170 that may receive audio signals from the environment via a microphone (not shown) and provide audio output via a speaker (not shown). Audio signals may be coupled with video signals and other messages by a messaging application or social media application implemented on the mobile device 1100. The mobile device 1100 may execute mobile application software 1120 such as SNAPCHAT® available from Snap, Inc. of Santa Monica, CA that is loaded into flash memory 1105.

Mobile device 1100 is configured to run algorithm 100 as described with reference to FIGS. 3A-3D and FIG. 4. In one example, front facing camera 1125 of mobile device 1100 is used to capture selfie input image 102 which is distorted due to a short camera-to-face distance. CPU 1110 runs algorithm 100 stored in memory 1105 or 1165 of mobile device 1100 to output improved selfie image 104. Distortion in the forehead, nose, cheek bones, jaw line, chin, lips, eyes, eyebrows, ears, hair, and neck of the face is improved in processed selfie image 104 as compared to selfie image 102. In one example, a user manually selects a camera-to-face distance for processed selfie image 104 as shown for the varying camera distances in FIG. 3D. The selection of the camera-to-face distance may be done with a manual sliding user interface displayed on display 1130 of device 1100, or it may be a discrete selection presented by a user interface displayed on the display 1130. Algorithm 100 automatically adjusts the focal length of the processed selfie image 104 to keep pupillary distance the same as selfie image 102.

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an ASIC. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionalities, as described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of image processing using a pre-trained three-dimension (3D) face generative adversarial network (GAN) having a generator and a neural renderer, comprising the steps of:
   processing an input image including a face;
   improving face latent code and camera parameters of the 3D face GAN by:
      freezing the generator and the neural renderer to improve face latent code and camera parameters;
      adjusting a face-to-camera distance and a camera focal length while maintaining a pupillary distance of the face constant; and
      rendering a photorealistic image;
   fine tuning the generator; and
   generating an improved image of the face with reduced face distortion by setting a longer camera-to-face distance.

2. The method of claim 1, wherein processing the input image comprises cropping and aligning the face.

3. The method of claim 1, wherein improving the face latent code and camera parameters comprises:
   obtaining a depth map and a normal map, and rendering photorealistic face images based on a random face latent and initialization of the camera parameters;
   calculating losses; and
   using gradient descent to improve the face latent code and camera parameters until the losses converge.

4. The method of claim 3, wherein the losses are calculated by a weighted summation of a difference between the rendered photorealistic face images and the input image, a smoothness of an intermediate depth map and the normal map, and an adversarial loss of fake faces rendered with wrong camera parameters.

5. The method of claim 1, wherein fine tuning the generator further comprises:
   using the pre-trained 3D face GAN to obtain a depth map and a normal map and render photorealistic face images;
   calculating losses; and
   using gradient descent to improve parameters of the generator and the neural renderer of the 3D GAN until the losses converge.

6. The method of claim 5, wherein the losses are calculated by a weighted summation of a difference between the rendered photorealistic images and the input image, a smoothness of an intermediate depth map and the normal map, and an adversarial loss of fake faces rendered with the generator and the neural renderer.

7. The method of claim 1, wherein the improved image has a longer camera-to-face distance than the input image.

8. A method of image processing using a pre-trained three-dimension (3D) face generative adversarial network (GAN) having a generator and a neural renderer, comprising the steps of:
   processing an input image including a face;
   improving face latent code and camera parameters of the 3D face GAN by:
      freezing the generator and the neural renderer;
      obtaining a depth map and a normal map, and rendering photorealistic face images based on a random face latent and initialization of the camera parameters;
      calculating losses; and
      using gradient descent to improve the face latent code and camera parameters until the losses converge;
   fine tuning the generator; and
   generating an improved image of the face with reduced face distortion by setting a longer camera-to-face distance, wherein a face-to-camera distance is estimated by a known iris size of the face, wherein the estimated face-to-camera distance is used to improve the face latent code and camera parameters.

9. A method of image processing using a pre-trained three-dimension (3D) face generative adversarial network (GAN) having a generator and a neural renderer, comprising the steps of:
   processing an input image including a face;
   improving face latent code and camera parameters of the 3D face GAN by:
      freezing the generator and the neural renderer;
      obtaining a depth map and a normal map, and rendering photorealistic face images based on a random face latent and initialization of the camera parameters;
      calculating losses; and
      using gradient descent to improve the face latent code and camera parameters until the losses converge;
   fine tuning the generator; and
   generating an improved image of the face with reduced face distortion by setting a longer camera-to-face distance, wherein a face-to-camera distance is estimated by a known pupillary distance of the face, wherein the estimated face-to-camera distance is used to improve the face latent code and camera parameters.

10. The method of claim 3, wherein a reference image of the face captured at a different time together with the input image are used to estimate a 3d of the face, wherein the 3d is used to improve the face latent code and camera parameters.

11. The method of claim 3, wherein a burst of images of the face are used to estimate a 3d of the face, wherein the 3d is used to improve the face latent code and camera parameters.

12. The method of claim 3, wherein a depth image of the face is used to improve the face latent code and camera parameters.

13. A pre-trained three-dimension (3D) face generative adversarial network (GAN) having a generator and a neural renderer, configured to:
   process an input image including a face;
   improve face latent code and camera parameters of the 3D face GAN by:
      freezing the generator and the neural renderer to improve face latent code and camera parameters;
      adjusting a face-to-camera distance and a camera focal length while maintaining a pupillary distance of the face constant; and
      rendering a photorealistic image;
   fine tune the generator; and generate an improved image of the face with reduced face distortion due to setting a longer camera-to-face distance.

14. The pre-trained three-dimension (3D) face generative adversarial network (GAN) of claim 13, wherein the processing of the input image comprises cropping and aligning the face.

15. The pre-trained three-dimension (3D) face generative adversarial network (GAN) of claim 13, wherein improving the face latent code and camera parameters comprises:

obtaining a depth map and a normal map, and rendering photorealistic face images based on a random face latent and initialization of the camera parameters;

calculating losses; and using gradient descent to improve the face latent code and camera parameters until the losses converge.

16. The pre-trained three-dimension (3D) face generative adversarial network (GAN) of claim 15, wherein the losses are calculated by a weighted summation of a difference between the rendered photorealistic face images and the input image, a smoothness of an intermediate depth map and the normal map, and an adversarial loss of fake faces rendered with wrong camera parameters.

17. The pre-trained three-dimension (3D) face generative adversarial network (GAN) of claim 13, wherein fine tuning the generator is calculated by:

using the pre-trained 3D face GAN to obtain a depth map and a normal map and render photorealistic face images;

calculating losses; and using gradient descent to optimize parameters of the generator and the neural renderer of the 3D GAN until the losses converge.

18. The pre-trained three-dimension (3D) face generative adversarial network (GAN) of claim 17, wherein the losses are calculated by a weighted summation of a difference between the rendered photorealistic images and the input image, a smoothness of an intermediate depth map and the normal map, and an adversarial loss of fake faces rendered with the generator and the neural renderer.

19. A non-transitory computer readable storage medium that stores instructions that when executed by a processor cause the processor to process an image using a pre-trained three-dimension (3D) face generative adversarial network (GAN) having a generator and a neural renderer by performing the steps of:

processing the image including a face;

improving face latent code and camera parameters of the 3D face GAN by;

freezing the generator and the neural renderer to improve face latent code and camera parameters;

adjusting a face-to-camera distance and a camera focal length while maintaining a pupillary distance of the face constant; and rendering a photorealistic image;

tuning a generator of the 3D face GAN; and generating an improved image of the face with reduced face distortion due to a longer camera-to-face distance.

* * * * *